US012770606B2

(12) United States Patent
Tamiya et al.

(10) Patent No.: US 12,770,606 B2
(45) Date of Patent: Oct. 20, 2026

(54) ACOUSTIC SYSTEM AND ELECTRONIC MUSICAL INSTRUMENT

(71) Applicant: YAMAHA CORPORATION, Hamamatsu (JP)

(72) Inventors: Kenichi Tamiya, Hamamatsu (JP); Takahiro Ohno, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 208 days.

(21) Appl. No.: 18/891,500

(22) Filed: Sep. 20, 2024

(65) Prior Publication Data

US 2025/0014566 A1 Jan. 9, 2025

Related U.S. Application Data

(63) Continuation of application No. PCT/JP2022/024073, filed on Jun. 16, 2022.

(30) Foreign Application Priority Data

Mar. 22, 2022 (JP) ................................ 2022-045382

(51) Int. Cl.
*G10K 15/12* (2006.01)
*H04R 1/28* (2006.01)
*H04R 1/34* (2006.01)

(52) U.S. Cl.
CPC ............... *G10K 15/12* (2013.01); *H04R 1/28* (2013.01); *H04R 1/34* (2013.01)

(58) Field of Classification Search
CPC .. G10K 15/12; H04R 1/28; H04R 1/34; H04S 7/305; H04S 2420/01; H04S 1/00; G10H 1/00

(Continued)

(56) References Cited

U.S. PATENT DOCUMENTS 9,264,834 B2 * 2/2016 Soulodre .................. G01H 7/00
11,304,017 B2 * 4/2022 Parvaix .................... H04R 3/00

(Continued)

FOREIGN PATENT DOCUMENTS

JP H06217400 A 8/1994
JP H09330092 A * 12/1997

(Continued)

OTHER PUBLICATIONS

International Search Report issued in Intl. Appln. No. PCT/JP2022/024073 mailed Sep. 13, 2022. English translation provided.

(Continued)

*Primary Examiner* — Carolyn R Edwards
*Assistant Examiner* — Friedrich Fahnert
(74) *Attorney, Agent, or Firm* — ROSSI, KIMMS & McDOWELL LLP

(57) ABSTRACT

An acoustic system includes: a memory storing computer-executable instructions; a processor that implements the computer-executable instructions stored in the memory to execute a plurality of tasks. The plurality of tasks includes: a first signal acquiring task that acquires an acoustic signal and a first reverberation signal representing a waveform of reverberation sound corresponding to the acoustic signal; and a second signal processing task that generates a second reverberation signal by performing binaural processing and transaural processing on the first reverberation signal. The acoustic system further includes: a first speaker configured to emit sound corresponding to the acoustic signal; and a second speaker that is a dipole speaker, the second speaker being configured to emit reverberation sound corresponding to the second reverberation signal.

9 Claims, 6 Drawing Sheets

(58) Field of Classification Search
USPC ........................................................... 381/63
See application file for complete search history.

(56) References Cited

U.S. PATENT DOCUMENTS

| | | | | |
|---|---|---|---|---|
| 2004/0013271 | A1 * | 1/2004 | Moorthy ................. | H04S 1/002 381/1 |
| 2006/0050907 | A1 * | 3/2006 | Levitsky ................ | H04R 1/345 381/304 |
| 2007/0133831 | A1 | 6/2007 | Kim et al. | |
| 2022/0394412 | A1 * | 12/2022 | Thigpen .................. | H04S 7/305 |

FOREIGN PATENT DOCUMENTS

| | | | |
|---|---|---|---|
| JP | 2000333297 | A | 11/2000 |
| JP | 2003259499 | A | 9/2003 |
| JP | 2004506395 | A | 2/2004 |
| WO | 2007035055 | A1 | 3/2007 |

OTHER PUBLICATIONS

Written Opinion issued in Intl. Appln. No. PCT/JP2022/024073 mailed Sep. 13, 2022.
Office Action issued in Japanese Application No. 2022-045382 dated Nov. 7, 2025.
Written Opinion issued in International Appln. No. PCT/JP2022/024073 mailed Sep. 13, 2022.

* cited by examiner

ACOUSTIC SYSTEM AND ELECTRONIC MUSICAL INSTRUMENT

CROSS-REFERENCE TO RELATED APPLICATIONS

This is a continuation of International Application No. PCT/JP2022/024073 filed on Jun. 16, 2022, and claims priority from Japanese Patent Application No. 2022-045382 filed on Mar. 22, 2022, the entire content of which is incorporated herein by reference.

FIELD

The present disclosure relates to a technique for emitting sound corresponding to an acoustic signal.

BACKGROUND

Various techniques for controlling a sound image perceived by a listener have been proposed in the related art. For example, JP2000-333297A discloses a technique for controlling a position of a sound image by reproducing, by a dipole-type stereo speaker, an acoustic signal generated by sound image localization processing.

SUMMARY

Here, it is assumed that direct sound directly reaching a listener from a sound source and reverberation sound corresponding to the direct sound are reproduced. When the sound image localization processing is performed on an acoustic signal including both the direct sound and the reverberation sound, emission of the direct sound and the reverberation sound is delayed due to the sound image localization processing. The delay of the direct sound is more easily perceived by the listener than the delay of the reverberation sound. In consideration of the above circumstances, an object of an aspect of the present disclosure is to emit reverberation sound in which a sense of depth or a spatial impression is sufficiently perceived while preventing a delay of direct sound.

An acoustic system according to an aspect of the present disclosure includes: a memory storing computer-executable instructions; a processor that implements the computer-executable instructions stored in the memory to execute a plurality of tasks, including: a first signal acquiring task that acquires an acoustic signal and a first reverberation signal representing a waveform of reverberation sound corresponding to the acoustic signal; and a second signal processing task that generates a second reverberation signal by performing binaural processing and transaural processing on the first reverberation signal; a first speaker configured to emit sound corresponding to the acoustic signal; and a second speaker that is a dipole speaker, the second speaker being configured to emit reverberation sound corresponding to the second reverberation signal.

An electronic musical instrument according to an aspect of the present disclosure includes: an operation receiving device configured to receive a performance operation of a user; a signal generator configured to generate an acoustic signal corresponding to the operation on the operation receiving unit; a memory storing computer-executable instructions; a processor that implements the computer-executable instructions stored in the memory to execute a plurality of tasks, including: a first reverberation generating task that generates a first reverberation signal representing a waveform of reverberation sound corresponding to the acoustic signal; a second reverberation generating task that generates a second reverberation signal by performing binaural processing and transaural processing on the first reverberation signal; a first speaker configured to emit sound corresponding to the acoustic signal; and a second speaker that is a dipole speaker, the second speaker being configured to emit reverberation sound corresponding to the second reverberation signal.

BRIEF DESCRIPTION OF DRAWINGS

The present disclosure will be described in detail based on the following without being limited thereto, wherein.

DETAILED DESCRIPTION

A: First Embodiment

Figure 1:
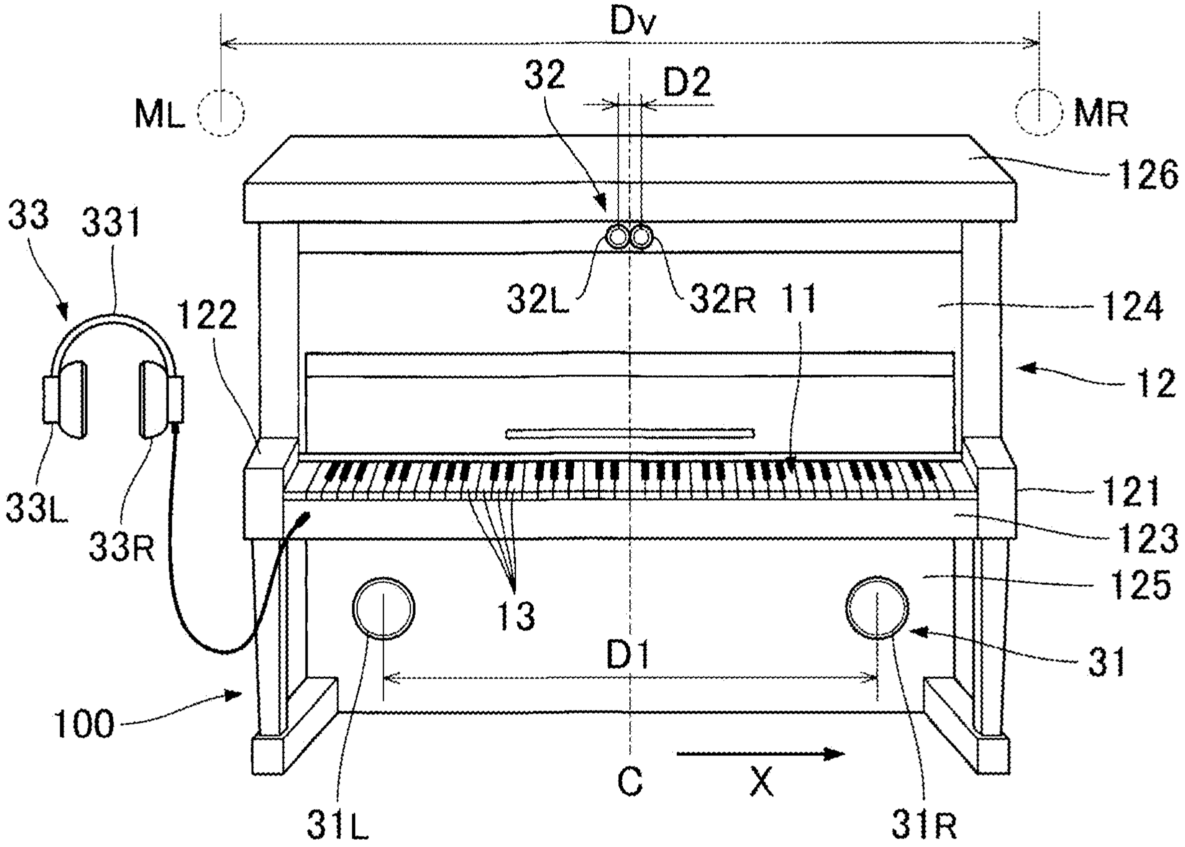
FIG. 1 is a front view of an electronic musical instrument.

FIG. 1 is a front view of an electronic musical instrument 100 according to a first embodiment. The electronic musical instrument 100 is a keyboard musical instrument including a keyboard 11 and a housing 12. The electronic musical instrument 100 is an example of an "acoustic system".

The keyboard 11 includes a plurality of keys 13 (white keys and black keys) corresponding to different pitches. The plurality of keys 13 are arranged along an X-axis. A user plays desired music by sequentially operating the plurality of keys 13. That is, the keyboard 11 is an operation receiving unit that receives a performance operation of the user. An X-axis direction is a longitudinal direction of the keyboard 11 and corresponds to a left-right direction of the user playing the electronic musical instrument 100.

The housing 12 is a structure that supports the keyboard 11. Specifically, the housing 12 includes a right arm tree 121, a left arm tree 122, a key bed 123 (key slip), an upper front board 124, a lower front board 125, and a top board 126 (roof). The key bed 123 is a plate-shaped member that supports the keyboard 11 from below in a vertical direction. The keyboard 11 and the key bed 123 are installed between the right arm tree 121 and the left arm tree 122. The upper front board 124 and the lower front board 125 are flat plate member constituting a front surface of the housing 12, and are installed parallel to the vertical direction. The upper front board 124 is located above the keyboard 11, and the lower front board 125 is located below the keyboard 11. The top board 126 is a flat plate member constituting a top surface of the housing 12. A gap along the X-axis is formed between the upper front board 124 and the top board 126.

In the following description, a reference plane C is assumed. The reference plane C is a symmetrical plane of the electronic musical instrument 100. That is, the reference plane C is a virtual plane perpendicular to the X-axis, and passes through a middle point of the keyboard 11 in the X-axis direction.

Figure 2:
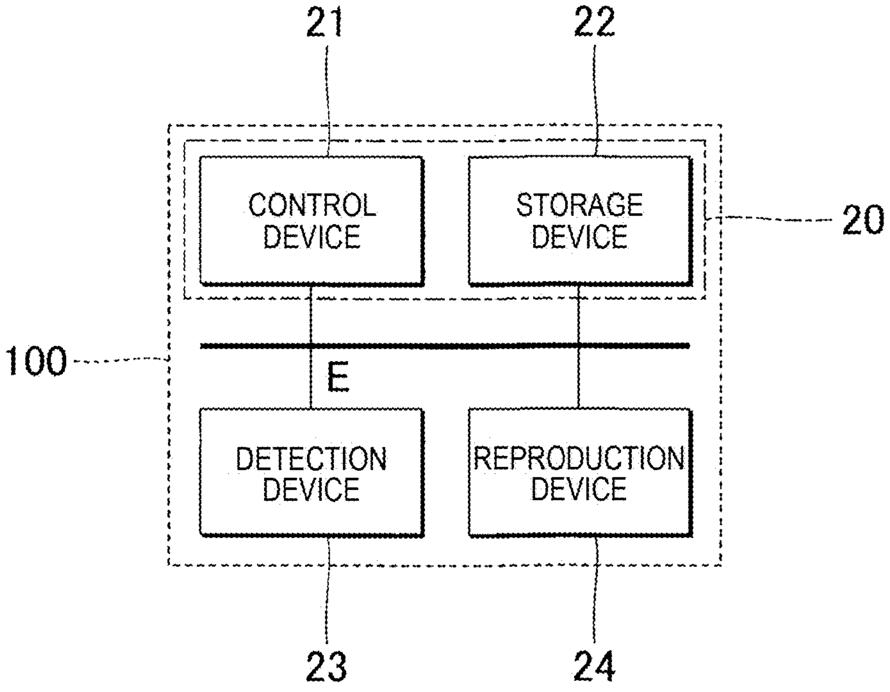
FIG. 2 is a block diagram illustrating an electrical configuration of the electronic musical instrument.

FIG. 2 is a block diagram illustrating an electrical configuration of the electronic musical instrument 100. The electronic musical instrument 100 includes a control device 21, a storage device 22, a detection device 23, and a reproduction device 24. The control device 21 and the storage device 22 constitute a control system 20 that controls an operation of the electronic musical instrument 100. In the first embodiment, a form in which the control system 20 is mounted in the electronic musical instrument 100 is exemplified, but the control system 20 may be configured separately from the electronic musical instrument 100. For example, the control system 20 may be implemented by an information device such as a smartphone or a tablet terminal.

The control device 21 is one or more processors that control the operation of the electronic musical instrument 100. Specifically, the control device 21 is implemented by one or more types of processors such as a central processing unit (CPU), a graphics processing unit (GPU), a sound processing unit (SPU), a digital signal processor (DSP), a field programmable gate array (FPGA), an application specific integrated circuit (ASIC).

The storage device 22 is one or more memories that store a program to be executed by the control device 21 and various data to be used by the control device 21. For example, a known recording medium such as a semiconductor recording medium and a magnetic recording medium, or a combination of a plurality of types of recording media is used as the storage device 22. For example, a portable recording medium detachable from the electronic musical instrument 100 or a recording medium (for example, a cloud storage) accessible by the control device 21 via a communication network may be used as the storage device 22.

The detection device 23 is a sensor unit that detects an operation on the keyboard 11 from the user. Specifically, the detection device 23 outputs performance information E specifying the key 13 operated by the user among the plurality of keys 13 constituting the keyboard 11. The performance information E is, for example, event data of a musical instrument digital interface (MIDI) for designating a number corresponding to the key 13 operated by the user.

Figure 3:
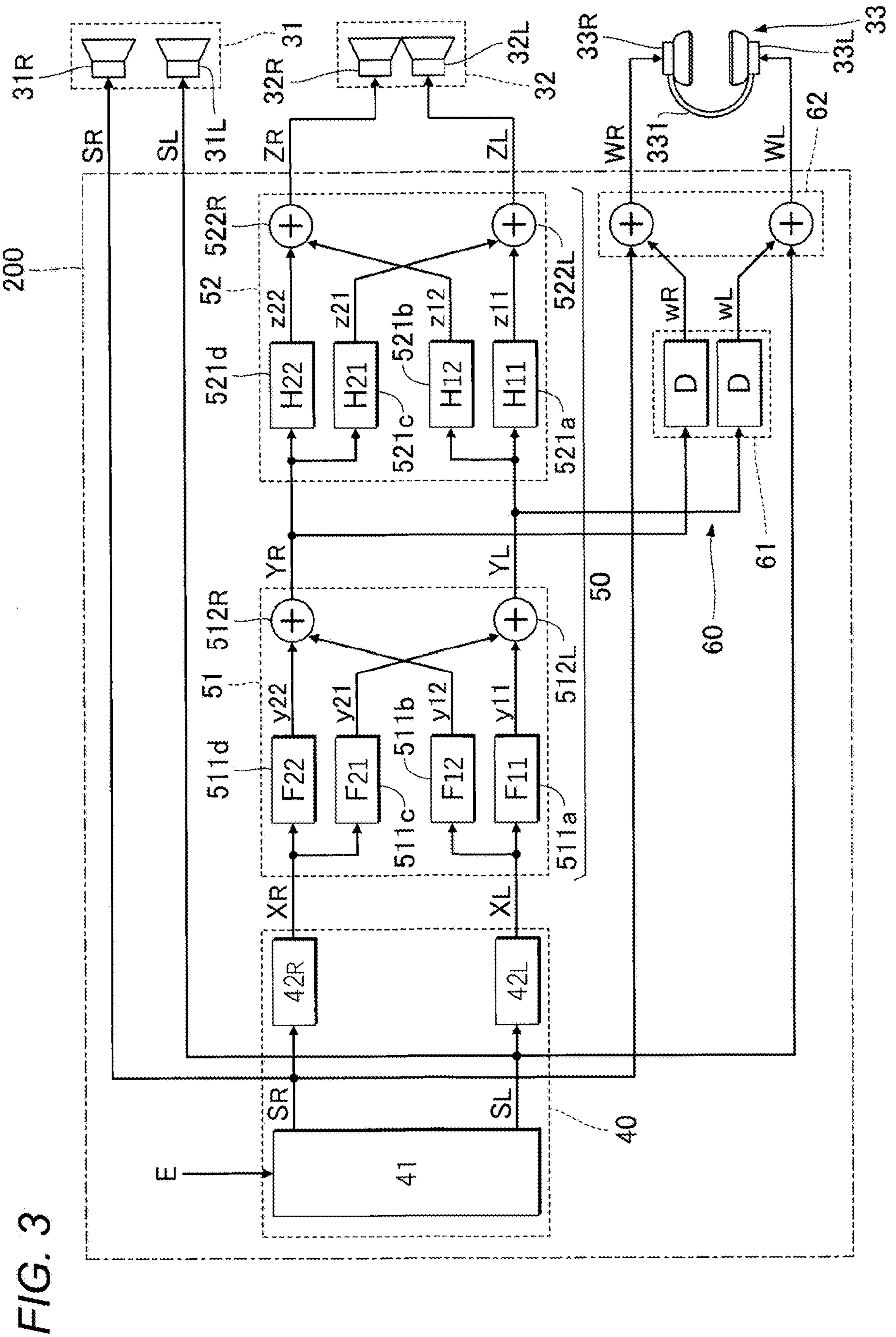
FIG. 3 is a block diagram illustrating a functional configuration of the electronic musical instrument.

The reproduction device 24 emits sound corresponding to an operation on the keyboard 11 from the user. FIG. 3 is a block diagram illustrating a functional configuration of the electronic musical instrument 100. The reproduction device 24 includes a first speaker 31, a second speaker 32, and a headphone 33. The first speaker 31 and the second speaker 32 are installed in the housing 12. The headphone 33 is connected to the electronic musical instrument 100 in a wired or wireless manner.

The first speaker 31 is a stereo speaker including a first left channel speaker 31L and a first right channel speaker 31R. As illustrated in FIG. 1, the first speaker 31 is installed on the lower front board 125 of the housing 12. Specifically, the first left channel speaker 31L and the first right channel speaker 31R are installed on the lower front board 125 with a spacing distance D1 in the X-axis direction. Specifically, when viewed from the front of the electronic musical instrument 100, the first left channel speaker 31L is located on a left side of the reference plane C, and the first right channel speaker 31R is located on a right side of the reference plane C. The spacing distance D1 is a distance between a central axis of a diaphragm of the first left channel speaker 31L and a central axis of a diaphragm of the first right channel speaker 31R. A virtual plane at an equal distance from the central axis of the diaphragm of the first left channel speaker 31L and the central axis of the diaphragm of the first right channel speaker 31R may be recognized as the reference plane C.

The second speaker 32 in FIG. 3 is a dipole-type stereo speaker (that is, a stereo dipole speaker) including a second left channel speaker 32L and a second right channel speaker 32R. That is, the user can perceive a stereoscopic sound field from the second left channel speaker 32L and the second right channel speaker 32R arranged close to each other. Each of the second left channel speaker 32L and the second right channel speaker 32R has a smaller diameter than each of the first left channel speaker 31L and the first right channel speaker 31R.

As illustrated in FIG. 1, the second speaker 32 is installed along an upper peripheral edge of the upper front board 124 in the vertical direction. Specifically, the second speaker 32 is installed in a gap between the upper front board 124 and the top board 126 of the housing 12. The second left channel speaker 32L and the second right channel speaker 32R are installed with a spacing distance D2 in the X-axis direction. That is, when viewed from the front of the electronic musical instrument 100, the second left channel speaker 32L is located on the left side of the reference plane C, and the second right channel speaker 32R is located on the right side of the reference plane C. The spacing distance D2 is a distance between a central axis of a diaphragm of the second left channel speaker 32L and a central axis of a diaphragm of the second right channel speaker 32R. As understood from the above description, the first speaker 31 and the second speaker 32 are positioned on opposite sides across the keyboard 11. A virtual plane at an equal distance from the central axis of the diaphragm of the second left channel speaker 32L and the central axis of the diaphragm of the second right channel speaker 32R may be recognized as the reference plane C.

As understood from FIG. 1, the spacing distance D1 between the first left channel speaker 31L and the first right channel speaker 31R is larger than the spacing distance D2 between the second left channel speaker 32L and the second right channel speaker 32R (D1>D2).

The headphone 33 is a stereo headphone including a left ear speaker 33L and a right ear speaker 33R, and is worn on a head of the user. The left ear speaker 33L and the right ear speaker 33R are connected to each other via a headband 331. The left ear speaker 33L is attached to a left ear of the user, and the right ear speaker 33R is attached to a right ear of the user.

As illustrated in FIG. 3, the control device 21 functions as an acoustic processing unit 200 by executing the program stored in the storage device 22. The acoustic processing unit 200 generates an acoustic signal S (SL, SR), a reverberation signal Z (ZL, ZR), and a reproduction signal W (WL, WR). Specifically, the acoustic processing unit 200 includes a signal acquiring unit 40, a signal processing unit 50, and a reproduction processing unit 60.

The acoustic signal S is a left and right two-channel stereo signal including a left channel acoustic signal SL and a right channel acoustic signal SR. The acoustic signal S is supplied to the first speaker 31. Specifically, the left channel acoustic signal SL is supplied to the first left channel speaker 31L, and the right channel acoustic signal SR is supplied to the first right channel speaker 31R. A D/A converter for converting the acoustic signal S from digital to analog and an amplifier for amplifying the acoustic signal S are not shown for the sake of convenience.

The reverberation signal Z is a left and right two-channel stereo signal including a left channel reverberation signal ZL and a right channel reverberation signal ZR. The reverberation signal Z is supplied to the second speaker 32. Specifically, the left channel reverberation signal ZL is supplied to the second left channel speaker 32L, and the right channel reverberation signal ZR is supplied to the second right channel speaker 32R. A D/A converter for converting the reverberation signal Z from digital to analog and an amplifier for amplifying the reverberation signal Z are not shown for the sake of convenience. The reverberation signal Z is an example of a "second reverberation signal".

The reproduction signal W is a left and right two-channel stereo signal including a left channel reproduction signal WL and a right channel reproduction signal WR. The reproduction signal W is supplied to the headphone 33. Specifically, the left channel reproduction signal WL is supplied to the left ear speaker 33L, and the right channel reproduction signal WR is supplied to the right ear speaker 33R. A D/A converter for converting the reproduction signal W from digital to analog and an amplifier for amplifying the reproduction signal W are not shown for the sake of convenience.

The signal acquiring unit 40 acquires the acoustic signal S (SL, SR) and a reverberation signal X (XL, XR). The reverberation signal X is a left and right two-channel stereo signal including a left channel reverberation signal XL and a right channel reverberation signal XR.

The signal acquiring unit 40 of the first embodiment includes a sound source unit 41 and a reverberation generating unit 42 (42L, 42R). The sound source unit 41 generates the acoustic signal S (SL, SR) corresponding to an operation of the user on the keyboard 11. Specifically, the sound source unit 41 is a MIDI sound source that generates the acoustic signal S corresponding to the performance information E output by the detection device 23. That is, the acoustic signal S is a signal representing a waveform of sound having pitches corresponding to one or more keys 13 operated by the user. The sound source unit 41 is, for example, a software sound source implemented by the control device 21 executing a sound source program, or a hardware sound source implemented by an electronic circuit dedicated to generation of the acoustic signal S. The acoustic signal S represents a waveform of direct sound (dry sound) not containing reverberation sound. The sound source unit 41 is an example of a "signal generating unit".

The acoustic signal S generated by the sound source unit 41 is supplied to the first speaker 31. The first speaker 31 emits the direct sound corresponding to the acoustic signal S. Specifically, the first left channel speaker 31L emits the direct sound corresponding to the acoustic signal SL, and the first right channel speaker 31R emits the direct sound corresponding to the acoustic signal SR.

The reverberation generating unit 42L and the reverberation generating unit 42R generate the reverberation signal X (XL, XR) representing a waveform of the reverberation sound corresponding to the acoustic signal S. Specifically, the reverberation generating unit 42L generates the reverberation signal XL by performing reverberation processing on the acoustic signal SL. The reverberation generating unit 42R generates the reverberation signal XR by performing the reverberation processing on the acoustic signal SR. The reverberation processing is calculation processing for simulating sound reflection in a virtual acoustic space. The reverberation signal X (XL, XR) represents a waveform of the reverberation sound (wet sound) not containing the direct sound. The reverberation signal X is an example of a "first reverberation signal".

The signal processing unit 50 generates the reverberation signal Z (ZL, ZR) by performing signal processing on the reverberation signal X (XL, XR). The signal processing unit 50 of the first embodiment includes a first processing unit 51 and a second processing unit 52.

The first processing unit 51 generates an intermediate signal Y (YL, YR) by performing binaural processing on the reverberation signal X. The intermediate signal Y is a left and right two-channel stereo signal including a left channel intermediate signal YL and a right channel intermediate signal YR.

The binaural processing is a signal processing for localizing a sound image at a specific position by applying a head-related transfer characteristic F (F11, F12, F21, F22) to the reverberation signal X. Specifically, the first processing unit 51 includes four characteristic applying units 511 (511*a*, 511*b*, 511*c*, 511*d*) and two adding units 512 (512L, 512R). Each of the characteristic applying units 511 executes a convolution operation of applying the head-related transfer characteristic F to the reverberation signal X.

Figure 4:
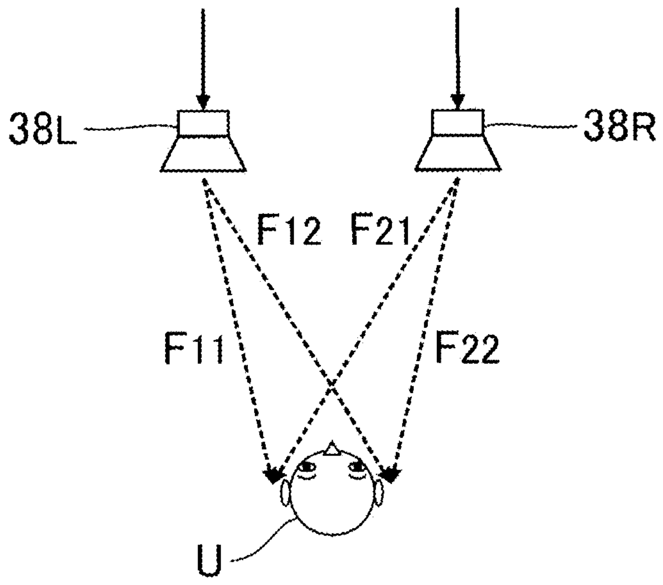
FIG. 4 is a diagram illustrating binaural processing.

FIG. 4 is a diagram illustrating the binaural processing. The binaural processing is signal processing for simulating a behavior in which sound emitted from a virtual left channel speaker 38L and right channel speaker 38R is transmitted to both ears of a listener U. The head-related transfer characteristic F11 is a transfer characteristic from the left channel speaker 38L to an ear canal of a left ear of the listener U (that is, a performer of the electronic musical instrument 100). The head-related transfer characteristic F12 is a transfer characteristic from the left channel speaker 38L to an ear canal of a right ear of the listener U. The head-related transfer characteristic F21 is a transfer characteristic from the right channel speaker 38R to the ear canal of the left ear of the listener U. The head-related transfer characteristic F22 is a transfer characteristic from the right channel speaker 38R to the ear canal of the right ear of the listener U.

The characteristic applying unit 511*a* of FIG. 3 applies the head-related transfer characteristic F11 to the reverberation signal XL to generate a signal y11. The characteristic applying unit 511*b* applies the head-related transfer characteristic F12 to the reverberation signal XL to generate a signal y12. The characteristic applying unit 511*c* applies the head-related transfer characteristic F21 to the reverberation signal XR to generate a signal y21. The characteristic applying unit 511*d* applies the head-related transfer characteristic F22 to the reverberation signal XR to generate the signal y22.

The adding unit 512L generates the intermediate signal YL by adding the signal y11 and the signal y21. That is, propagation of acoustic reaching the left ear of the listener U from the left channel speaker 38L and the right channel speaker 38R is simulated. The adding unit 512R generates the intermediate signal YR by adding the signal y12 and the signal y22. That is, propagation of acoustic reaching the right ear of the listener U from the left channel speaker 38L and the right channel speaker 38R is simulated.

The head-related transfer characteristic F (F11, F12, F21, F22) is set to cause, when the intermediate signal Y is reproduced by the headphone 33, a virtual speaker that emits the reverberation sound represented by the intermediate signal Y to be located at a position separated from the electronic musical instrument 100. Specifically, as illustrated in FIG. 1, the head-related transfer characteristic F is set to cause the virtual speakers (a first virtual speaker ML and a second virtual speaker MR) of the reverberation sound perceived by the user to be located at positions on an upper left side and an upper right side of the electronic musical instrument 100. The first virtual speaker ML and the second virtual speaker MR are positioned on opposite sides across the reference plane C. A distance Dv between the first virtual speaker ML and the second virtual speaker MR is greater than the spacing distance D2 between the second left channel speaker 32L and the second right channel speaker 32R. Further, the distance Dv between the first virtual speaker ML and the second virtual speaker MR is greater than the spacing distance D1 between the first left channel speaker 31L and the first right channel speaker 31R.

The second processing unit 52 of FIG. 3 generates the reverberation signal Z (ZL, ZR) by performing transaural processing on the intermediate signal Y (YL, YR). The transaural processing is signal processing for crosstalk cancellation. Specifically, the transaural processing is processing of adjusting the intermediate signal Y such that sound corresponding to the intermediate signal YL does not reach the right ear of the user (that is, reaches only the left ear) and sound corresponding to the intermediate signal YR does not reach the left ear of the user (that is, reaches only the right ear). The transaural processing is also expressed as processing of adjusting the reverberation sound represented by the intermediate signal Y such that a characteristic of the reverberation sound reaching the user from the second speaker 32 approaches the characteristic of the reverberation sound reproduced by the headphone 33. Specifically, the second processing unit 52 includes four characteristic applying units 521 (521*a*, 521*b*, 521*c*, 521*d*) and two adding units 522 (522L, 522R). Each of the characteristic applying units 521 executes a convolution operation of applying a transfer characteristic H (H11, H12, H21, H22) to the intermediate signal Y.

Figure 5:
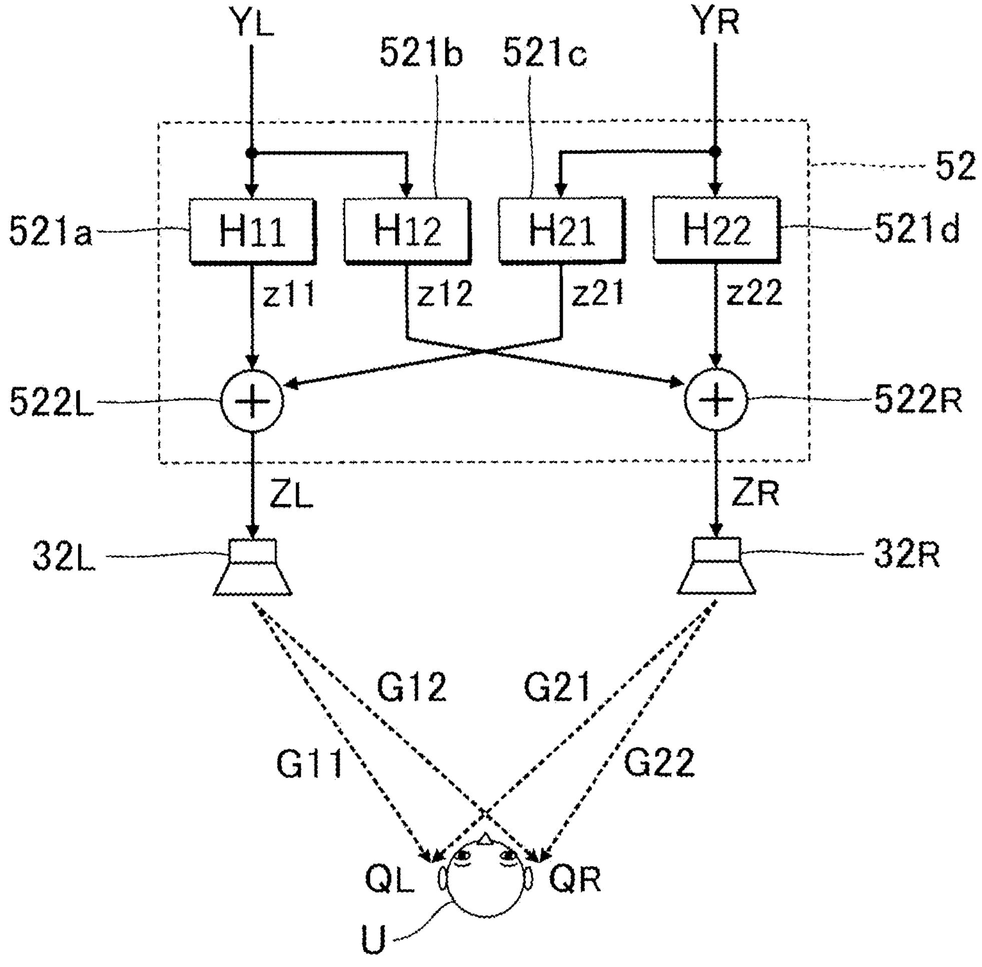
FIG. 5 is a diagram illustrating transaural processing.

FIG. 5 is a diagram illustrating the transaural processing. The characteristic applying unit 521*a* applies the transfer characteristic H11 to the intermediate signal YL to generate a signal z11. The characteristic applying unit 521*b* applies the transfer characteristic H12 to the intermediate signal YL to generate a signal z12. The characteristic applying unit 521*c* applies the transfer characteristic H21 to the intermediate signal YR to generate a signal z21. The characteristic applying unit 521*d* applies the transfer characteristic H22 to the intermediate signal YR to generate a signal z22. The adding unit 522L generates the reverberation signal ZL by adding the signal z11 and the signal z21. The adding unit 522R generates the reverberation signal ZR by adding the signal z12 and the signal z22. As understood from the above description, the processing of generating the reverberation signal Z by the second processing unit 52 is expressed by the following Formula 1.

$$\begin{pmatrix} Z_L \\ Z_R \end{pmatrix} = \begin{pmatrix} H_{11} & H_{21} \\ H_{12} & H_{22} \end{pmatrix} \begin{pmatrix} L \\ Y_R \end{pmatrix} \tag{1}$$

FIG. 5 illustrates a transfer characteristic G (G11, G12, G21, G22). The transfer characteristic G11 is s transfer characteristic from the second left channel speaker 32L to the left ear of the listener U, and the transfer characteristic G12 is a transfer characteristics from the second left channel speaker 32L to the right ear of the listener U. Further, the transfer characteristic G21 is a transfer characteristic from the second right channel speaker 32R to the left ear of the listener U, and the transfer characteristic G22 is a transfer characteristics from the second right channel speaker 32R to the right ear of the listener U. Therefore, an acoustic component QL reaching the left ear of the listener U from the second speaker 32 and an acoustic component QR reaching the right ear of the listener U from the second speaker 32 are expressed by the following Formula 2. Crosstalk is when the sound reaches the right ear of the listener U from the second left channel speaker 32L, and the sound reaches the left ear of the listener U from the second right channel speaker 32R.

$$\begin{pmatrix} Q_L \\ Q_R \end{pmatrix} = \begin{pmatrix} G_{11} & G_{21} \\ G_{12} & G_{22} \end{pmatrix} \begin{pmatrix} Z_L \\ Z_R \end{pmatrix} \tag{2}$$

Formula 3 below is derived from Formula 1 and Formula 2.

$$\begin{pmatrix} Q_L \\ Q_R \end{pmatrix} = \begin{pmatrix} G_{11} & G_{21} \\ G_{12} & G_{22} \end{pmatrix} \begin{pmatrix} H_{11} & H_{21} \\ H_{12} & H_{22} \end{pmatrix} \begin{pmatrix} Y_L \\ Y_R \end{pmatrix} \tag{3}$$

On the other hand, assuming that crosstalk is removed from the convolution of the transfer characteristics H, the following formula 4 is derived. A symbol e jot in Formula 4 means a delay of the acoustic component Q (QL, QR) with respect to the intermediate signal Y.

$$\begin{pmatrix} Q_L \\ Q_R \end{pmatrix} = \begin{pmatrix} Y_L \\ Y_R \end{pmatrix} e^{-j\omega t} \tag{4}$$

Formula 5 below expressing a condition of the transfer characteristic H is derived from Formula 3 and Formula 4.

$$\begin{pmatrix} H_{11} & H_{21} \\ H_{12} & H_{22} \end{pmatrix} = \begin{pmatrix} G_{11} & G_{21} \\ G_{12} & G_{22} \end{pmatrix}^{-1} e^{-j\omega t} \tag{5}$$

As understood from Formula (5), the transfer characteristic H (H11, H12, H21, H22) applied to the generation of the reverberation signal Z (ZL, ZR) correspond to an inverse characteristic of the transfer characteristic G from the second speaker 32 to both ears of the user. Specifically, the transfer characteristic G assumed in a sound field from the second speaker 32 to the user is experimentally or tentatively specified, and the transfer characteristic H, which is the inverse characteristic of the transfer characteristic G, is set. The second processing unit 52 generates the reverberation signal Z by performing the transaural processing in which the transfer characteristic H described above is applied.

As described above, the signal processing unit 50 generates the reverberation signal Z by performing the binaural processing and the transaural processing on the reverberation signal X. Therefore, the reverberation signal Z is delayed with respect to the acoustic signal S by a time required for the binaural processing and the transaural processing.

As illustrated in FIG. 3, the reverberation signal Z generated by the signal processing unit 50 (second processing unit 52) is supplied to the second speaker 32. The second speaker 32 emits reverberation sound corresponding to the reverberation signal Z. Specifically, the second left channel speaker 32L emits the reverberation sound corresponding to the reverberation signal ZL, and the second right channel speaker 32R emits the reverberation sound corresponding to the reverberation signal ZR. As described above, the direct sound represented by the acoustic signal S is emitted from the first speaker 31, and the reverberation sound corresponding to the acoustic signal S is emitted from the dipole-type second speaker 32. As described above, since the signal processing unit 50 performs the transaural processing in addition to the binaural processing, the transfer characteristic G from the second speaker 32 to the user is reduced. Therefore, the user can clearly perceive the binaural processing-based first virtual speaker ML and second virtual speaker MR.

As described above, according to the first embodiment, the direct sound corresponding to the acoustic signal S is emitted from the first speaker 31. On the other hand, the reverberation signal Z is generated by performing the binaural processing and the transaural processing on the reverberation signal X representing the waveform of the reverberation sound corresponding to the acoustic signal S. The reverberation sound corresponding to the reverberation signal Z is emitted from the dipole-type second speaker 32. Therefore, as compared with a configuration in which the binaural processing and the transaural processing are performed on a signal including both the direct sound and the reverberation sound, the reverberation sound in which a sense of depth and a spatial impression are sufficiently perceived by the user can be emitted while preventing a delay of the direct sound. Since a delay of the reverberation sound is difficult to be perceived, the delay of the reverberation sound caused by the signal processing performed by the signal processing unit 50 is not a particular problem.

In the first embodiment, musical sound corresponding to the operation of the user on the keyboard 11 is emitted from the first speaker 31 as the direct sound. In a configuration in which the delay of the direct sound is large, generation of the musical sound is delayed with respect to the operation of the user on the keyboard 11, which may hinder a smooth and natural performance of the user. In consideration of the above circumstances, the present disclosure that can prevent the delay of direct sound is particularly preferably employed in the electronic musical instrument 100 as exemplified in the first embodiment.

Further, in an aspect in which the binaural processing and the transaural processing are performed on the signal including both the direct sound and the reverberation sound, a tone of the direct sound may change before and after the processing. In the first embodiment, the binaural processing and the transaural processing are performed on the reverberation signal X representing the waveform of the reverberation sound corresponding to the acoustic signal S. Therefore, in the direct sound emitted from the first speaker 31, a change in the tone caused by the binaural processing or the transaural processing does not occur. The change in the tone of the reverberation sound is difficult to be perceived. Therefore, the change in the tone of the reverberation sound caused by the signal processing performed by the signal processing unit 50 is not a particular problem.

As described above, the signal processing unit 50 performs the binaural processing and the transaural processing to cause the virtual speaker of the reverberation sound corresponding to the reverberation signal Z to be located at a position separated from the acoustic system. That is, as described above, the binaural processing and the transaural processing are performed such that the first virtual speaker ML and the second virtual speaker MR of the reverberation sound corresponding to the reverberation signal Z are positioned on opposite sides across the reference plane C. Therefore, regarding the reverberation sound emitted by the second speaker 32, the user can sufficiently perceive the sense of depth and the spatial impression. Further, in the first embodiment, the spacing distance D1 between the first left channel speaker 31L and the first right channel speaker 31R is larger than the spacing distance D2 between the second left channel speaker 32L and the second right channel speaker 32R. Therefore, regarding the direct sound corresponding to the acoustic signal S, the user can also sufficiently perceive the sense of depth and the spatial impression.

In the first embodiment, the first left channel speaker 31L and the second left channel speaker 32L are located on the left side of the reference plane C, and the first right channel speaker 31R and the second right channel speaker 32R are located on the right side of the reference plane C. Therefore, regarding both the direct sound corresponding to the acoustic signal S and the reverberation sound corresponding to the reverberation signal Z, the user can sufficiently perceive the sense of depth and the spatial impression.

The positions of the first virtual speaker ML and the second virtual speaker MR are not limited to the above examples. For example, the virtual speakers (the first virtual speaker ML and the second virtual speaker MR) may be located at positions on a lower left side and a lower right side of the electronic musical instrument 100. According to the configuration in which the virtual speaker is located at positions on the lower left side and the lower right side of the electronic musical instrument 100, for example, even in an environment in which the electronic musical instrument 100 is installed on a floor surface having a high sound absorbing property such as a carpet, the user can perceive the sense of depth and the spatial impression of the reverberation sound.

The reproduction processing unit 60 of FIG. 3 generates the reproduction signal W (WL, WR) to be supplied to the headphone 33. Since the emitted sound from the headphone 33 directly reaches both ears of the user, the transfer characteristic G is not applied to the emitted sound reaching both ears of the user. Therefore, the transaural processing is not necessary when generating the reproduction signal W. Therefore, the reproduction processing unit 60 generates the reproduction signal W according to the acoustic signal S and the intermediate signal Y. As described above, the intermediate signal Y is a signal before performing the transaural processing. The reproduction processing unit 60 of the first embodiment includes a delay unit 61 and an adding unit 62.

The delay unit 61 delays the intermediate signal Y. Specifically, the delay unit 61 generates an intermediate signal wL by delaying the intermediate signal YL by a delay amount D, and generates an intermediate signal wR by delaying the intermediate signal YR by the delay amount D. The delay amount D corresponds to a processing time required for the transaural processing performed by the second processing unit 52.

The adding unit 62 generates the reproduction signal W by adding the delayed intermediate signal w (wL, wR) and the acoustic signal S (SL, SR). Specifically, the adding unit 62 generates the left channel reproduction signal WL by adding the delayed intermediate signal wL and the acoustic signal SL, and generates the right channel reproduction signal WR by adding the delayed intermediate signal wR and the acoustic signal SR. Therefore, the reproduction signal W is a signal representing a waveform of a mixed sound including the direct sound and the reverberation sound.

The adding unit 62 outputs the reproduction signal W to the headphone 33. The headphone 33 emits the direct sound and the reverberation sound corresponding to the reproduction signal W. Specifically, the left ear speaker 33L emits the direct sound and the reverberation sound corresponding to the reproduction signal WL, and the right ear speaker 33R emits the direct sound and the reverberation sound corresponding to the reproduction signal WR. Therefore, the user can perceive the binaural processing-based virtual speaker of the reverberation sound through the headphone 33. Specifically, while listening to the direct sound represented by the acoustic signal S, the user of the headphone 33 perceives the first virtual speaker ML and the second virtual speaker MR of the reverberation sound corresponding to the reverberation signal Z being on the opposite sides across the reference plane C. Therefore, the user can sufficiently perceive the sense of depth and the spatial impression of the reverberation sound.

Further, in the first embodiment, the reproduction signal w is generated by adding the intermediate signal w delayed by the delay unit 61 and the acoustic signal S. Therefore, the delay of the reverberation sound with respect to the direct sound can cause emitted sound of the first speaker 31 and the second speaker 32 and emitted sound of the headphone 33 to be close to each other.

Figure 6:
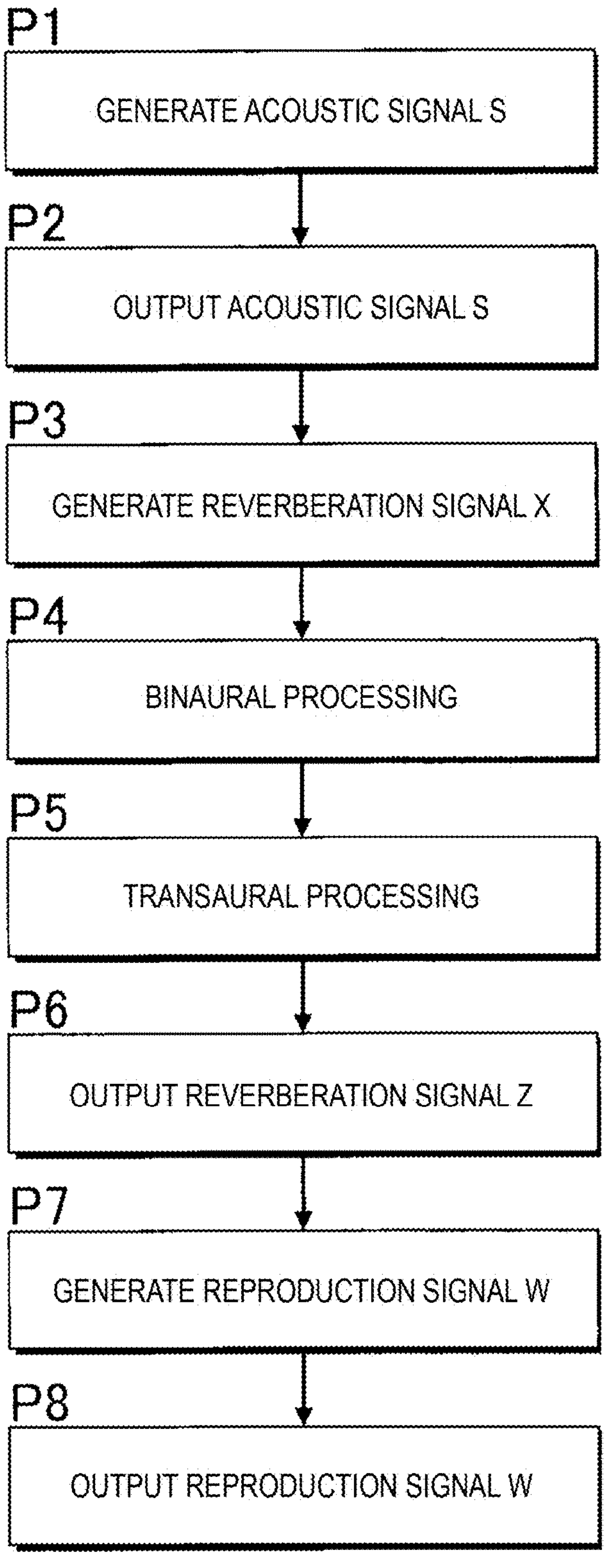
FIG. 6 is a flowchart of processing performed by a control device.

FIG. 6 is a flowchart of processing performed by the control device 21. For example, the processing of FIG. 6 is started when the user operates the keyboard 11.

When the processing is started, the control device 21 (sound source unit 41) generates the acoustic signal S corresponding to the operation of the user on the keyboard 11 (P1). The control device 21 supplies the acoustic signal S to the first speaker 31 (P2). The control device 21 (reverberation generating unit 42) generates the reverberation signal X representing the waveform of the reverberation sound corresponding to the acoustic signal S (P3).

The control device 21 (signal processing unit 50) generates the reverberation signal Z by performing the binaural processing and the transaural processing on the reverberation signal X (P4, P5). Specifically, the control device 21 (first processing unit 51) generates the intermediate signal Y by performing the binaural processing on the reverberation signal X (P4). Further, the control device 21 (second processing unit 52) generates the reverberation signal Z by performing the transaural processing on the intermediate signal Y (P5). The control device 21 supplies the reverberation signal Z to the second speaker 32 (P6). The control device 21 (reproduction processing unit 60) generates the reproduction signal W according to the acoustic signal S and the intermediate signal Y (P7). The control device 21 supplies the reproduction signal W to the headphone 33 (P8).

B: Second Embodiment

A second embodiment will be described. In each aspect to be exemplified below, elements having the same functions as those of the first embodiment are denoted by the same reference numerals as those in the description of the first embodiment, and detailed descriptions thereof are appropriately omitted.

Figure 7:
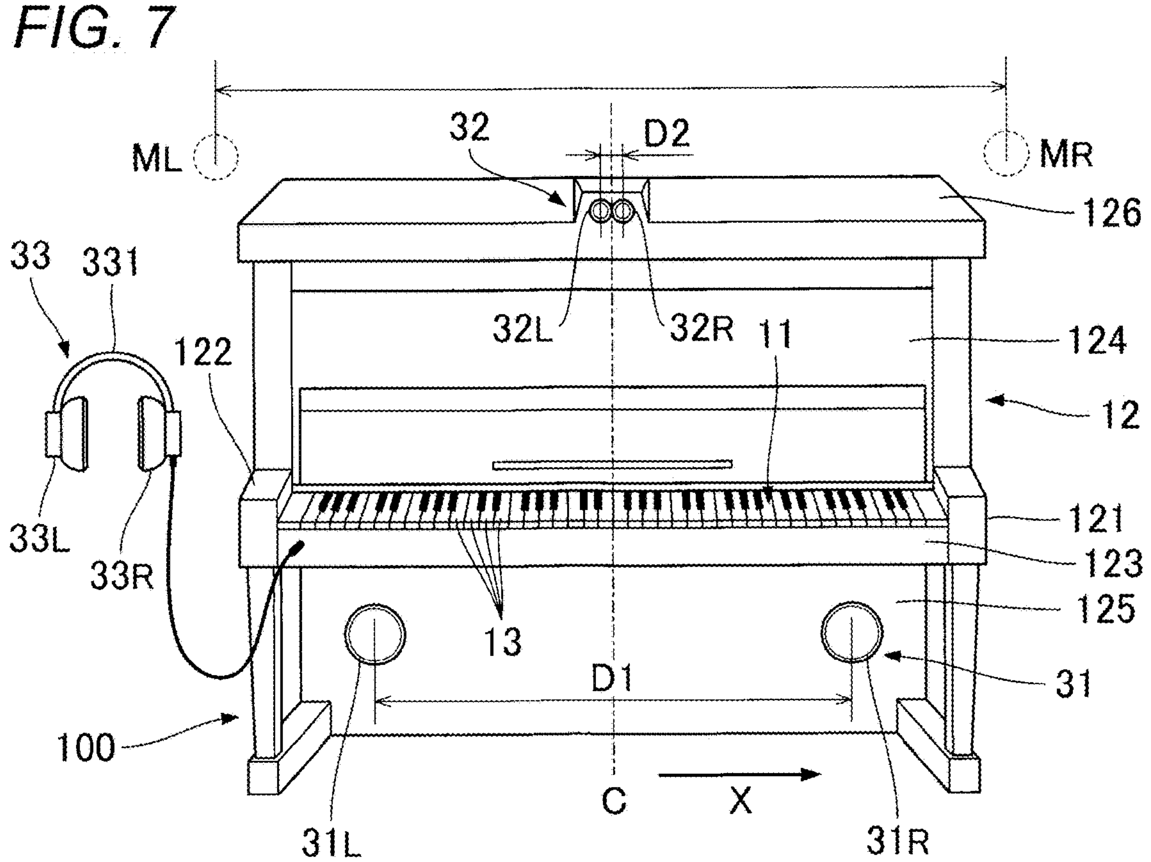
FIG. 7 is a front view of an electronic musical instrument according to a second embodiment.

FIG. 7 is a front view of the electronic musical instrument 100 according to the second embodiment. In the second embodiment, the position of the second speaker 32 is different from that in the first embodiment. The second embodiment is the same as the first embodiment except for the position of the second speaker 32. Therefore, in the second embodiment, effects similar to those of the first embodiment are also realized.

The second speaker 32 in the second embodiment is installed on an upper surface of the top board 126 of the housing 12. Specifically, the second left channel speaker 32L and the second right channel speaker 32R are installed on the upper surface of the top board 126 with the spacing distance D2 in the X-axis direction. The position of the first speaker 31 is the same as that of the first embodiment.

C: Third Embodiment

Figure 8:
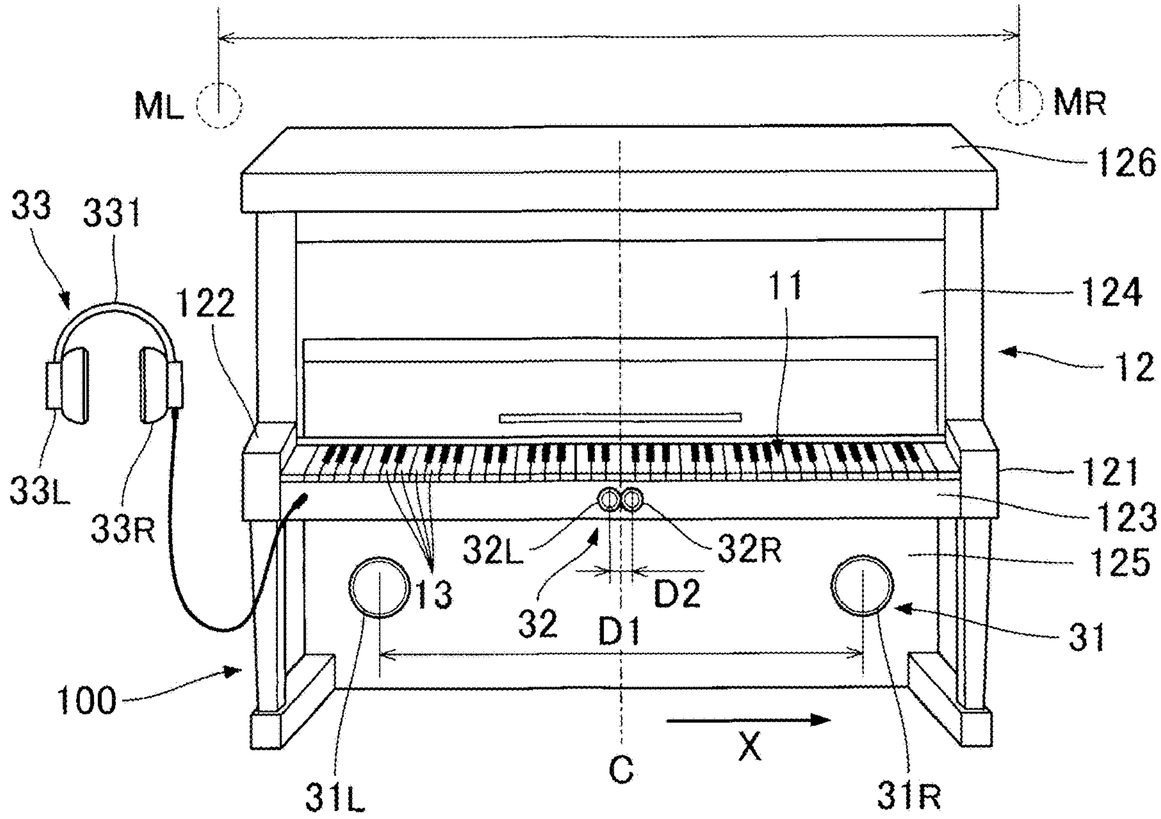
FIG. 8 is a front view of an electronic musical instrument according to a third embodiment.

FIG. 8 is a front view of the electronic musical instrument 100 according to a third embodiment. In the third embodiment, the position of the second speaker 32 is different from that in the first embodiment. The third embodiment is the same as the first embodiment except for the position of the second speaker 32. Therefore, in the third embodiment, effects similar to those of the first embodiment are also realized.

The second speaker 32 in the third embodiment is installed on a front surface of the key bed 123 in the housing 12. That is, the second speaker 32 is disposed below the keyboard 11 as viewed from the front of the electronic musical instrument 100. Specifically, the second left channel speaker 32L and the second right channel speaker 32R are installed on the front surface of the key bed 123 (key slip) with the spacing distance D2 in the X-axis direction. The position of the first speaker 31 is the same as that of the first embodiment.

D: Fourth Embodiment

Figure 9:
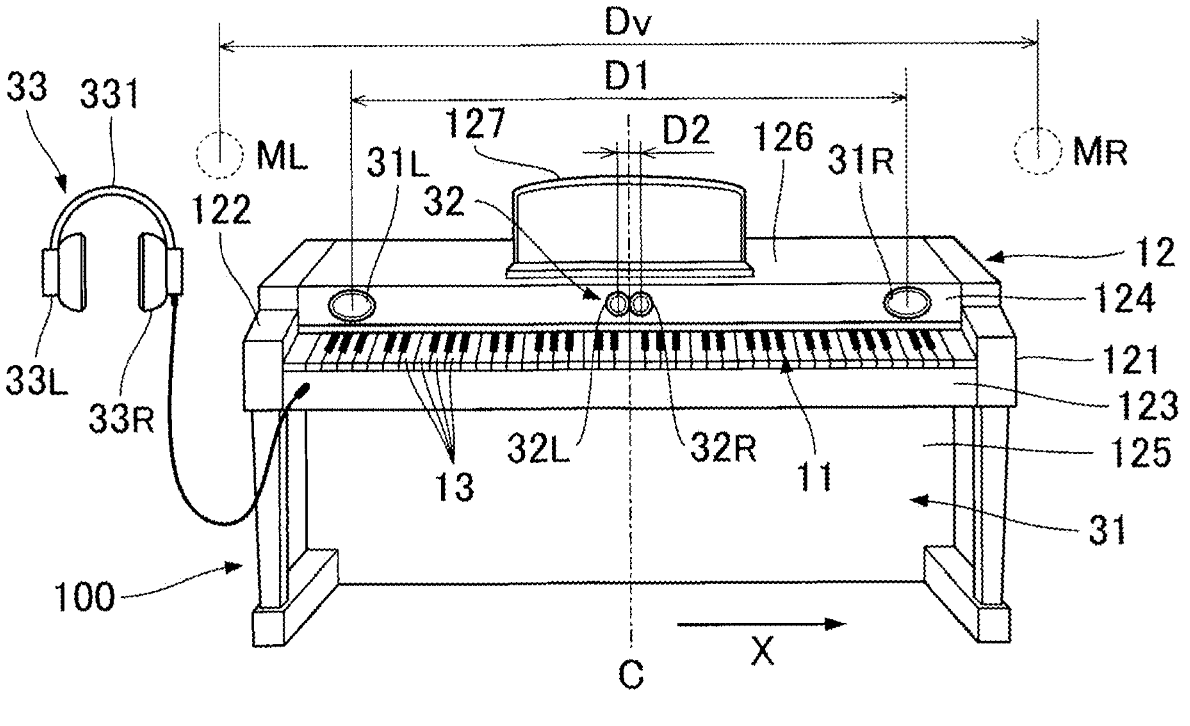
FIG. 9 is a front view of an electronic musical instrument according to a fourth embodiment.

FIG. 9 is a front view of the electronic musical instrument 100 according to a fourth embodiment. In the fourth embodiment, the positions of the first speaker 31 and the second speaker 32 are different from those in the first embodiment. The fourth embodiment is the same as the first embodiment except for the positions of the first speaker 31 and the second speaker 32. Therefore, in the fourth embodiment, effects similar to those of the first embodiment are also realized.

The housing 12 of the fourth embodiment has a configuration in which the upper front board 124 of the first embodiment is sufficiently low. That is, the upper front board 124 is a flat plate member elongated along the X-axis. The top board 126 is installed above the upper front board 124, and a music stand 127 is installed on an upper surface of the top board 126. The music stand 127 is located in front of or obliquely below the head of the user playing the electronic musical instrument 100.

The second speaker 32 is installed on the upper front board 124. Specifically, the second speaker 32 is installed between the music stand 127 and the keyboard 11 when viewed from the front of the electronic musical instrument 100. The second speaker 32 is installed at a center of the upper front board 124 in the X-axis direction. Meanwhile, the first speaker 31 is also installed on the upper front board 124. Specifically, the first left channel speaker 31L is located on a left side of the second speaker 32, and the first right channel speaker 31R is located on a right side of the second speaker 32. That is, the second speaker 32 is located between the first left channel speaker 31L and the first right channel speaker 31R.

E: Modification

Specific modified aspects added to the above-exemplified aspects will be exemplified below. A plurality of aspects freely selected from the above-described embodiments and the following examples may be combined as appropriate within a mutually consistent range.

(1) The positions of the first speaker 31 and the second speaker 32 are not limited to the positions illustrated in the above-described embodiments. For example, in the fourth embodiment, a form in which the first speaker 31 and the second speaker 32 are both located above the keyboard 11 is exemplified. Similarly, in the first to third embodiments, both the first speaker 31 and the second speaker 32 may also be installed above the keyboard 11. The first speaker 31 configured separately from the housing 12 may be connected to the control system 20 in a wired or wireless manner. Similarly, the second speaker 32 configured separately from the housing 12 may be connected to the control system 20 in a wired or wireless manner.

(2) In each of the above-described embodiments, the signal acquiring unit 40 generates the acoustic signal S and the reverberation signal X, and the method by which the signal acquiring unit 40 acquires the acoustic signal S and the reverberation signal X is not limited to the above example. For example, the signal acquiring unit 40 may receive one or both of the acoustic signal S and the reverberation signal X from an external device in a wired or wireless manner. Therefore, the sound source unit 41 and the reverberation generating unit 42 (42L, 42R) may be omitted from the signal acquiring unit 40. As understood from the above description, the signal acquiring unit 40 is comprehensively expressed as an element that acquires the acoustic signal S and the reverberation signal X. The "acquisition" performed by the signal acquiring unit 40 includes an operation of generating a signal by itself and an operation of receiving a signal from an external device.

(3) In each of the above-described embodiments, a form in which one acoustic signal S (SL, SR) is shared between the sound emission of the first speaker 31 and the sound emission of the headphone 33 is exemplified. However, the sound source unit 41 may individually generate the acoustic signal S for speaker reproduction and the acoustic signal S for headphone reproduction. The acoustic signal S for speaker reproduction is a signal adjusted to a sound quality suitable for reproduction by the first speaker 31. The reverberation generating unit 42 (42L, 42R) generates the reverberation signal X (XL, XR) from the acoustic signal S for speaker reproduction. On the other hand, the acoustic signal S for headphone reproduction is a signal adjusted to a sound quality suitable for reproduction by the headphone 33. In the above-described embodiment, the sound source unit 41 is expressed as including a first sound source unit that generates the acoustic signal S for speaker reproduction and a second sound source unit that generates the acoustic signal S for headphone reproduction.

(4) In each of the above-described embodiments, a form in which the reproduction signal W is supplied to the headphone 33 is exemplified, but an earphone without the headband 331 that is worn on the head of the user may be used instead of the headphone 33. Interpretation may be made in which one of the headphone 33 and the earphone is provided in the other. The reproduction processing unit 60 may be omitted.

(5) In each of the above embodiments, a form in which the first speaker 31 includes one first left channel speaker 31L is exemplified, but the first left channel speaker 31L may include a plurality of speakers. For example, the first left channel speaker 31L may include a plurality of speakers having different reproduction bands. Each of the speakers is at any position. Similarly, the first right channel speaker 31R may include a plurality of speakers. For example, the first right channel speaker 31R may include a plurality of speakers having different reproduction bands. Each of the speakers is at any position.

(6) In each of the above-described embodiments, a keyboard musical instrument is exemplified as the electronic musical instrument 100, but the present disclosure is also applicable to the electronic musical instruments 100 other than a keyboard instrument. The electronic musical instrument 100 is an example of the acoustic system, but the present disclosure is also applicable to an acoustic system other than the electronic musical instrument 100. For example, the present disclosure is applicable to any acoustic system having a function of emitting sound, such as a public address (PA) device, an audio visual (AV) device, a karaoke device, or a car stereo.

(7) The functions of the electronic musical instrument 100 (control system 20) according to each of the above aspects are implemented by cooperation of one or more processors constituting the control device 21 and the programs stored in the storage device 22. The above-exemplified programs may be provided in a form stored in a computer-readable recording medium and installed on a computer. The recording medium is, for example, a non-transitory recording medium, and is preferably an optical recording medium (optical disc) such as a CD-ROM, and may include any known type of recording medium such as a semiconductor recording medium or a magnetic recording medium. The non-transitory recording medium includes any recording medium other than transitory propagating signals, and does not exclude volatile recording media. In a configuration in which a distribution device distributes programs via a communication network, the recording medium that stores the programs in the distribution device corresponds to the above-described non-transitory recording medium.

F: Appendix

For example, the following configurations can be understood from the embodiments described above.

An acoustic system according to one aspect (Aspect 1) of the present disclosure includes: a signal acquiring unit configured to acquire an acoustic signal and a first reverberation signal representing a waveform of reverberation sound corresponding to the acoustic signal; a signal processing unit configured to generate a second reverberation signal by performing binaural processing and transaural processing on the first reverberation signal; a first speaker configured to emit sound corresponding to the acoustic signal; and a dipole-type second speaker configured to emit reverberation sound corresponding to the second reverberation signal.

According to the above aspect, direct sound (dry sound) corresponding to the acoustic signal is emitted from the first speaker. On the other hand, the second reverberation signal is generated by performing the binaural processing and the transaural processing on the first reverberation signal representing the waveform of the reverberation sound corresponding to the acoustic signal. The reverberation sound corresponding to the second reverberation signal is emitted from the dipole-type second speaker. Therefore, as compared with a configuration in which the binaural processing and the transaural processing are performed on a signal including both the direct sound and the reverberation sound, the reverberation sound in which a sense of depth and a spatial impression are sufficiently perceived by the user can be emitted while preventing a delay of the direct sound.

Since a delay of the reverberation sound is difficult to be perceived, the delay of the reverberation sound caused by the signal processing performed by the signal processing unit is not a particular problem. Further, in an aspect in which the binaural processing and the transaural processing are performed on the signal including both the direct sound and the reverberation sound, a tone of the direct sound may change before and after the processing. In the configuration of the present disclosure, the binaural processing and the transaural processing are performed on the first reverberation signal representing the waveform of the reverberation sound corresponding to the acoustic signal. Therefore, in the direct sound emitted from the first speaker, a change in the tone caused by the binaural processing or the transaural processing does not occur.

The "binaural processing" is signal processing for locating a sound image (virtual speaker) at a position separated from a listening position when listening through a headphone. Specifically, the "binaural processing" is implemented by applying (convolving) a head-related transfer characteristic from a position of the virtual speaker to positions of both ears of a listener to the first reverberation signal. That is, the "binaural processing" is signal processing in which the first reverberation signal is processed by a filter of a head-related transfer function. For example, the binaural processing is performed to case the sound image (virtual speaker) to be located at a position separated from the acoustic system.

The "transaural processing" is signal processing of making a listener listen to a signal equivalent to the binaural-processed signal by both ears of the listener by reducing a component corresponding to a transfer characteristic from a position of the second speaker to the positions of both ears of the listener. Specifically, the "transaural processing" is implemented by applying (convolving) an inverse characteristic of the transfer characteristic of the reproduced sound field to the reverberation signal generated from the first reverberation signal by the binaural processing. That is, the "transaural processing" is signal processing of processing the reverberation signal generated by the binaural processing by a filter of the inverse characteristic.

The "dipole-type" speaker is a speaker for causing a listener to perceive a stereoscopic sound field from two speakers arranged close to each other.

The "acoustic system" is any system including a signal processing function and a sound emission function. For example, various electronic musical instruments that emit sound are exemplified as the "acoustic systems". In addition, various systems such as an audio device, a karaoke device, a car stereo, and a PA device are included in the "acoustic system".

In a specific example (Aspect 2) of Aspect 1, the signal processing unit is configured to perform the binaural processing and the transaural processing to cause a virtual speaker of the reverberation sound corresponding to the second reverberation signal to be located at a position separated from the acoustic system. According to the above aspect, regarding the reverberation sound emitted by the second speaker, the listener can sufficiently perceive the sense of depth and the spatial impression.

In a specific example (Aspect 3) of Aspect 1 or Aspect 2, the signal processing unit includes a first processing unit configured to generate an intermediate signal by performing the binaural processing on the first reverberation signal, and a second processing unit configured to generate the second reverberation signal by performing the transaural processing on the intermediate signal, and the acoustic system further includes an adding unit configured to generate a reproduction signal by adding the intermediate signal and the acoustic signal, and output the reproduction signal to a headphone or an earphone. According to the above aspect, the listener can perceive the binaural processing-based virtual speaker through the headphone or the earphone.

In a specific example (Aspect 4) of Aspect 3, the acoustic system further includes a delay unit configured to delay the intermediate signal, and the adding unit is configured to add a signal delayed by the delay unit and the acoustic signal. According to the above aspect, the reproduction signal is generated by adding the intermediate signal delayed by the delay unit and the acoustic signal. Therefore, the delay of the reverberation sound with respect to the direct sound can cause emitted sound of the first speaker and the second speaker and emitted sound of the headphone or the earphone to be close to each other. A delay amount given to the intermediate signal by the delay unit is freely set, and is set to be approximate to or match a processing delay caused by the transaural processing, for example.

In a specific example (Aspect 5) of any one of Aspect 1 to Aspect 4, the acoustic signal includes a left channel acoustic signal and a right channel acoustic signal, the first speaker includes: a first left channel speaker configured to emit sound corresponding to the left channel acoustic signal; and a first right channel speaker configured to emit sound corresponding to the right channel acoustic signal, the second reverberation signal includes a left channel second reverberation signal and a right channel second reverberation signal, the second speaker includes: a second left channel speaker configured to emit sound corresponding to the left channel second reverberation signal; and a second right channel speaker configured to emit sound corresponding to the right channel second reverberation signal, and a spacing distance between the first left channel speaker and the first right channel speaker is larger than a spacing distance between the second left channel speaker and the second right channel speaker. According to the above aspect, the spacing distance between the first left channel speaker and the first right channel speaker constituting the first speaker is wider than the spacing distance between the second left channel speaker and the second right channel speaker constituting the second speaker. Therefore, regarding the direct sound corresponding to the acoustic signal, the listener can also sufficiently perceive the sense of depth and the spatial impression.

The first left channel speaker may be implemented by one speaker, or may include a plurality of speakers having different frequency bands of emitted sound. Similarly, the first right channel speaker also includes one or more speakers.

In a specific example (Aspect 6) of Aspect 5, the signal processing unit is configured to perform the binaural processing and the transaural processing to cause a first virtual speaker and a second virtual speaker of the reverberation sound corresponding to the second reverberation signal to be located on opposite sides across a reference plane located midway between the first right channel speaker and the first left channel speaker. According to the above aspect, since the first virtual speaker and the second virtual speaker of the reverberation sound are located on the opposite sides across the reference plane, the listener can sufficiently perceive the sense of depth and the spatial impression regarding the reverberation sound emitted by the second speaker.

The reference plane is, for example, a plane at an equal distance from a central axis of the first right channel speaker and a central axis of the first left channel speaker. A plane at an equal distance from a central axis of the second right channel speaker and a central axis of the second left channel speaker may be set as the reference plane.

An electronic musical instrument according to one aspect (Aspect 7) of the present disclosure includes: an operation receiving unit configured to receive a performance operation of a user; a signal generating unit configured to generate an acoustic signal corresponding to the operation on the operation receiving unit; a reverberation generating unit configured to generate a first reverberation signal representing a waveform of reverberation sound corresponding to the acoustic signal; a signal processing unit configured to generate a second reverberation signal by performing binaural processing and transaural processing on the first reverberation signal; a first speaker configured to emit sound corresponding to the acoustic signal; and a dipole-type second speaker configured to emit reverberation sound corresponding to the second reverberation signal.

In a specific example (Aspect 8) of Aspect 7, the acoustic signal includes a left channel acoustic signal and a right channel acoustic signal, the first speaker includes: a first left channel speaker configured to emit sound corresponding to the left channel acoustic signal; and a first right channel speaker configured to emit sound corresponding to the right channel acoustic signal, the second reverberation signal includes a left channel second reverberation signal and a right channel second reverberation signal, the second speaker includes: a second left channel speaker configured to emit sound corresponding to the left channel second reverberation signal; and a second right channel speaker configured to emit sound corresponding to the right channel second reverberation signal, the operation receiving unit is a keyboard in which a plurality of keys are arranged, and the first left channel speaker and the second left channel speaker are located on a left side and the first right channel speaker and the second right channel speaker are located on a right side across a reference plane perpendicular to a direction in which the plurality of keys are arranged and passing through a middle point of the keyboard in the direction. According to the above aspect, the first left channel speaker and the second left channel speaker are located on the left side of the reference plane, and the first right channel speaker and the second right channel speaker are located on the right side of the reference plane. Therefore, regarding the sound corresponding to the acoustic signal and the reverberation sound corresponding to the second reverberation signal, the listener can sufficiently perceive the sense of depth and the spatial impression.

In a specific example (Aspect 9) of Aspect 7 or Aspect 8, the electronic musical instrument further includes a housing in which the first speaker and the second speaker are installed, and the signal processing unit is configured to perform the binaural processing and the transaural processing to cause a virtual speaker of the reverberation sound corresponding to the second reverberation signal to be located at a position outside and separated from the housing. According to the above aspect, regarding the reverberation sound emitted by the second speaker, the listener can sufficiently perceive the sense of depth and the spatial impression.

The invention claimed is:

1. An acoustic system comprising:
- a memory storing computer-executable instructions;
- a processor that implements the computer-executable instructions stored in the memory to execute a plurality of tasks, including:
  - a first signal acquiring task that acquires an acoustic signal and a first reverberation signal representing a waveform of reverberation sound corresponding to the acoustic signal; and
  - a second signal processing task that generates a second reverberation signal by performing binaural processing and transaural processing on the first reverberation signal;
- a first speaker configured to emit sound corresponding to the acoustic signal; and
- a second speaker that is a dipole speaker, the second speaker being configured to emit reverberation sound corresponding to the second reverberation signal.

2. The acoustic system according to claim 1, wherein the second signal processing task performs the binaural processing and the transaural processing to cause a virtual speaker of the reverberation sound corresponding to the second reverberation signal to be located at a position separated from the acoustic system.

3. The acoustic system according to claim 1, wherein:
- the second signal processing task includes:
  - a first processing task that generates an intermediate signal by performing the binaural processing on the first reverberation signal; and
  - a second processing task that generates the second reverberation signal by performing the transaural processing on the intermediate signal, and
- the plurality of tasks further includes an adding task that generates a reproduction signal by adding the intermediate signal and the acoustic signal, and output the reproduction signal to a headphone or an earphone.

4. The acoustic system according to claim 3, wherein:
- the plurality of tasks further includes a delay task that delays the intermediate signal, and
- the adding task adds a delayed intermediate signal delayed by the delay task and the acoustic signal.

5. The acoustic system according to claim 1, wherein:
- the acoustic signal comprises a left channel acoustic signal and a right channel acoustic signal,
- the first speaker comprises:
  - a first left channel speaker configured to emit sound corresponding to the left channel acoustic signal; and
  - a first right channel speaker configured to emit sound corresponding to the right channel acoustic signal,
- the second reverberation signal comprises a left channel second reverberation signal and a right channel second reverberation signal,
- the second speaker comprises:
  - a second left channel speaker configured to emit sound corresponding to the left channel second reverberation signal; and
  - a second right channel speaker configured to emit sound corresponding to the right channel second reverberation signal, and
- a spacing distance between the first left channel speaker and the first right channel speaker is larger than a spacing distance between the second left channel speaker and the second right channel speaker.

6. The acoustic system according to claim 5, wherein the second signal processing task performs the binaural processing and the transaural processing to cause a first virtual speaker and a second virtual speaker of the reverberation sound corresponding to the second reverberation signal to be located on opposite sides across a reference plane located midway between the first right channel speaker and the first left channel speaker.

7. An electronic musical instrument comprising:

an operation receiving device configured to receive a performance operation of a user;

a signal generator configured to generate an acoustic signal corresponding to the operation on the operation receiving device;

a memory storing computer-executable instructions;

a processor that implements the computer-executable instructions stored in the memory to execute a plurality of tasks, including:

a first reverberation generating task that generates a first reverberation signal representing a waveform of reverberation sound corresponding to the acoustic signal; and a second reverberation generating task that generates a second reverberation signal by performing binaural processing and transaural processing on the first reverberation signal;

a first speaker configured to emit sound corresponding to the acoustic signal; and a second speaker that is a dipole speaker, the second speaker being configured to emit reverberation sound corresponding to the second reverberation signal.

8. The electronic musical instrument according to claim 7, wherein:

the acoustic signal comprises a left channel acoustic signal and a right channel acoustic signal, the first speaker comprises:

a first left channel speaker configured to emit sound corresponding to the left channel acoustic signal; and a first right channel speaker configured to emit sound corresponding to the right channel acoustic signal, the second reverberation signal comprises a left channel second reverberation signal and a right channel second reverberation signal, the second speaker comprises:

a second left channel speaker configured to emit sound corresponding to the left channel second reverberation signal; and a second right channel speaker configured to emit sound corresponding to the right channel second reverberation signal, the operation receiving device is a keyboard in which a plurality of keys are arranged, and the first left channel speaker and the second left channel speaker are located on a left side and the first right channel speaker and the second right channel speaker are located on a right side across a reference plane perpendicular to a direction in which the plurality of keys are arranged and passing through a middle point of the keyboard in the direction.

9. The electronic musical instrument according to claim 7, further comprising:

a housing in which the first speaker and the second speaker are installed, wherein the second reverberation generating task performs the binaural processing and the transaural processing to cause a virtual speaker of the reverberation sound corresponding to the second reverberation signal to be located at a position outside and separated from the housing.

* * * * *